United States Patent [19]
Gatti

[11] Patent Number: 5,017,136
[45] Date of Patent: May 21, 1991

[54] APPARATUS WITH MODULAR OPERATIVE BLOCKS FOR DENTISTRY

[75] Inventor: Armando Gatti, Bologna, Italy

[73] Assignee: Eurodent Industriale S.p.A., San Lazzaro Di Savena, Italy

[21] Appl. No.: 588,904

[22] Filed: Sep. 27, 1990

[30] Foreign Application Priority Data

Oct. 2, 1989 [IT] Italy ................................ 3638 A/89

[51] Int. Cl.[5] .......................... A61C 1/00; A61C 3/00; A61C 1/02

[52] U.S. Cl. .......................................... 433/98; 433/27

[58] Field of Search ............................ 433/98, 27, 101

[56] References Cited

U.S. PATENT DOCUMENTS 3,638,310 2/1972 Austin, Jr. ............................ 433/98
4,173,827 11/1979 Austin, Jr. ............................ 433/98
4,230,143 10/1980 Dettmann et al. .................. 137/270
4,676,750 6/1987 Mason ................................ 433/101

*Primary Examiner*—John J. Wilson
*Assistant Examiner*—Cindy Cherichetti
*Attorney, Agent, or Firm*—Guido Modiano; Albert Josif

[57] ABSTRACT

The modular dentistry apparatus comprises a plurality of modular operative blocks which each bear a respective instrument and have electric connection means and channels for supplying hydraulic and pneumatic power to said instrument which are suitable for being connected to similar connectors and power supply channels. The operative blocks are mutually associable in series by means of coupling means which comprise at least one pin which protrudes from a front face of each operative block and is adapted for coupling to a corresponding seat arranged on a rear face of an adjacent operative block and to be retained by locking means which are pneumatically actuated by means of a duct which is connectable to the pneumatic power supply channel of the instrument.

9 Claims, 3 Drawing Sheets

APPARATUS WITH MODULAR OPERATIVE BLOCKS FOR DENTISTRY

BACKGROUND OF THE INVENTION

The present invention relates to an apparatus with modular operative blocks for dentistry.

As is known, apparatuses commonly termed "dental units" are currently widespread in the field of dentistry; these apparatuses support in a modular manner the instruments to be used in the numbers and types suitable for the various requirements. These apparatuses are generally constituted by a plurality of operative units or blocks which are combined in series on a common support member which is in turn supported by an arm articulated so that it can be adjusted to the most convenient position in relation to the position assumed by the patient; each operative block bears a single instrument (for example a turbo-drill, syringe, scalpel, micromotor, ultrasound generator and the like) which is connected to the end of a flexible cable which includes the power supply ducts of the instrument itself.

Depending on their type, dentistry instruments have one or more controls connected to electric, pneumatic and hydraulic power supply means. For this purpose, the modular operative blocks conveniently have respective electric connection means and respective pneumatic and hydraulic ducts adapted for connection in series.

Each of the operative blocks has respective mechanical coupling elements, which are adapted for association with complementary couplings of the adjacent blocks, so that they can be mounted in series.

In known apparatuses, this modular mounting is rather complicated, so that the addition or removal of the operative blocks is generally difficult and requires a long downtime of the apparatus. This operation conversely is relatively frequent, both in order to modify the operative configuration of the apparatus in the course of time and to perform the necessary maintenance. On the other hand, the mechanical coupling of the modular operative blocks must be safely stable, besides ensuring the correct coupling of the electric, pneumatic and hydraulic power supplies.

SUMMARY OF THE INVENTION

The aim of the present invention is to solve the above described problem by providing a dentistry apparatus which allows the easy and safe modular assembly of the differnet operative blocks.

Within the scope of this aim, an object of the present invention is to provide a dentistry apparatus which is simple in concept and safely reliable in operation.

This aim and object, and other objects which will become apparent hereinafter are achieved, according to the invention, by a modular dentistry apparatus, comprising a plurality of modular operative blocks which each bears a respective instrument and have electric coupling means and channels for the hydraulic and pneumatic power supply of said instrument which are adapted for being connected to similar couplings and power supply channels, characterized in that said operative blocks are mutually associable in succession by means of coupling means comprising at least one pin which protrudes from a front face of each operative block and is adapted for coupling to a corresponding seat arranged on a rear face of said operative blocks and for being retained by locking means which are pneumatically actuated by means of a duct adapted for connection to said pneumatic power supply channel of the instrument.

BRIEF DESCRIPTION OF THE DRAWINGS

The details of the invention will become apparent from the detailed description of a preferred embodiment of the modular dentistry apparatus, illustrated only by way of non-limitative example in the accompanying drawings, wherein.

DESCRIPTION OF THE PREFERRED EMBODIMENTS

Figure 1:
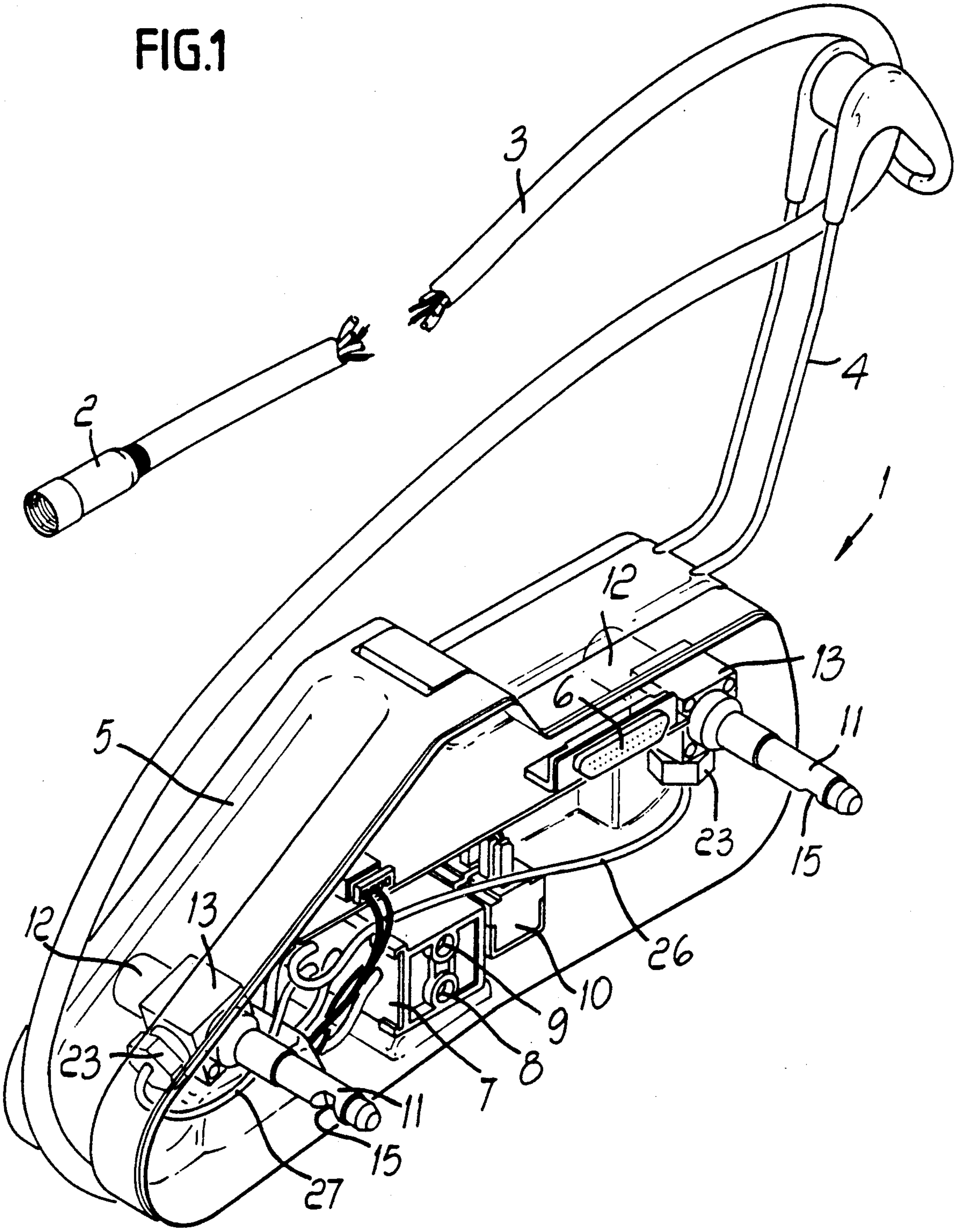
FIG. 1 is a perspective view of an operative block of the modular dentistry apparatus.

With particular reference to the above figures, the reference numeral 1 generally indicates a modular operative block of the dentistry apparatus according to the invention. The operative block 1 has a coupling 2 for an instrument which is connected to one end of a flexible cable 3; according to the requirements, the cable 3 internally bears appropriate electric conductors and/or pneumatic and hydraulic ducts for the power supply of said instrument. The cable 3 is supported by a fork-shaped articulated and balanced arm 4 which is articulated above a box-like body 5. The box-like body 5 has an open front face which is intended to be associated with the rear face of a similar operative block, as described in greater detail hereinafter. A multiple-socket electric connector 6 and a distribution body 7 are accommodated in the box-like body 5; said distribution body is traversed at least by the channels 8 and 9, respectively for the hydraulic and pneumatic power supply, which are cutoff by appropriate electric valve elements 10. The electric connector 6 is connectable to an electric connector which is complementary thereto and is mounted on the rear face of the operative block which is associated in a modular manner, which is not visible in the drawings. In turn, the power supply channels 8 and 9 are intended to sealingly couple to corresponding couplings which protrude from said rear face of the associated operative block.

Figure 2:
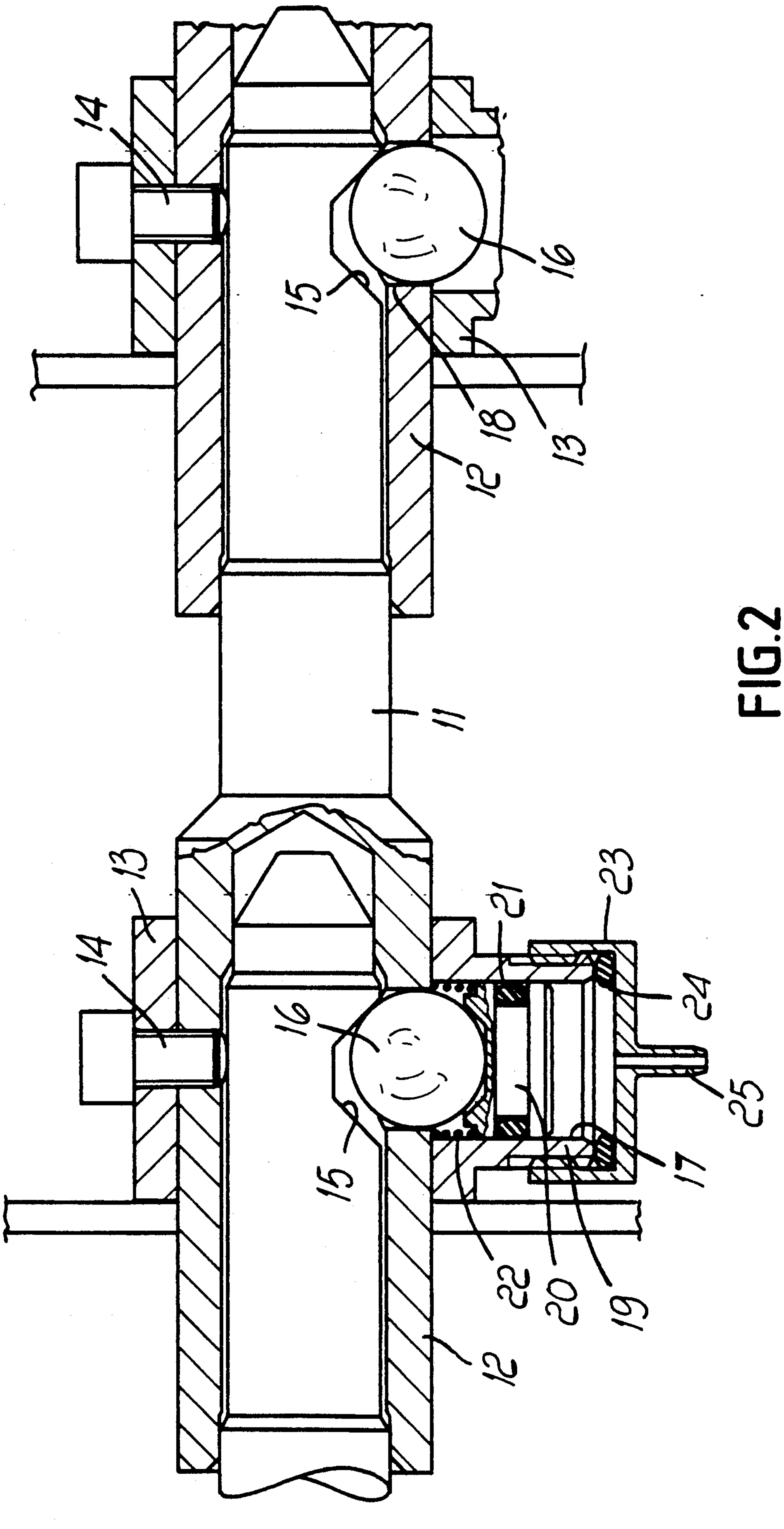
FIG. 2 is a longitudinal sectional view of said coupling means in the position in which the operative blocks are blocked.

The box-like body 5 has mechanical coupling means constituted by a pair of pins 11 which protrude from the front face of said box-like body in spaced-apart positions. The pins 11 are intended to couple to respective seats which are correspondingly provided on the rear face of the operative blocks and are constituted by tubular stems 12, as shown in detail in FIG. 2. Conveniently, each pin 11 is provided monolithically with a related tubular stem 12 so as to constitute a male-female coupling element for connecting to adjacent operative blocks.

Each tubular stem 12 is through-mounted in a support 13 to which it is rigidly associated by screw means 14. The pin 11 is externally provided with a transverse groove 15 with flared sides. The groove 15 is suitable for being engaged by a ball 16 for the locking of the associated operative blocks. The ball 16 is mounted freely within a cylindrical accommodation seat 17 which is perpendicular to the tubular stem 12 and passes through a hole 18 of said tubular stem. A tooth 18a prevents the escape of the ball 16 from the hole 18.

The cylindrical seat 17 extends along a sleeve 19 which is defined by the support 13 and slidably bears a piston 20 which defines a groove for an annular sealing gasket 21. The piston 20 has a concave front surface which acts on the ball 16 against the biasing action of a helical spring 22 accommodated in said cylindrical seat 17.

Figure 4:
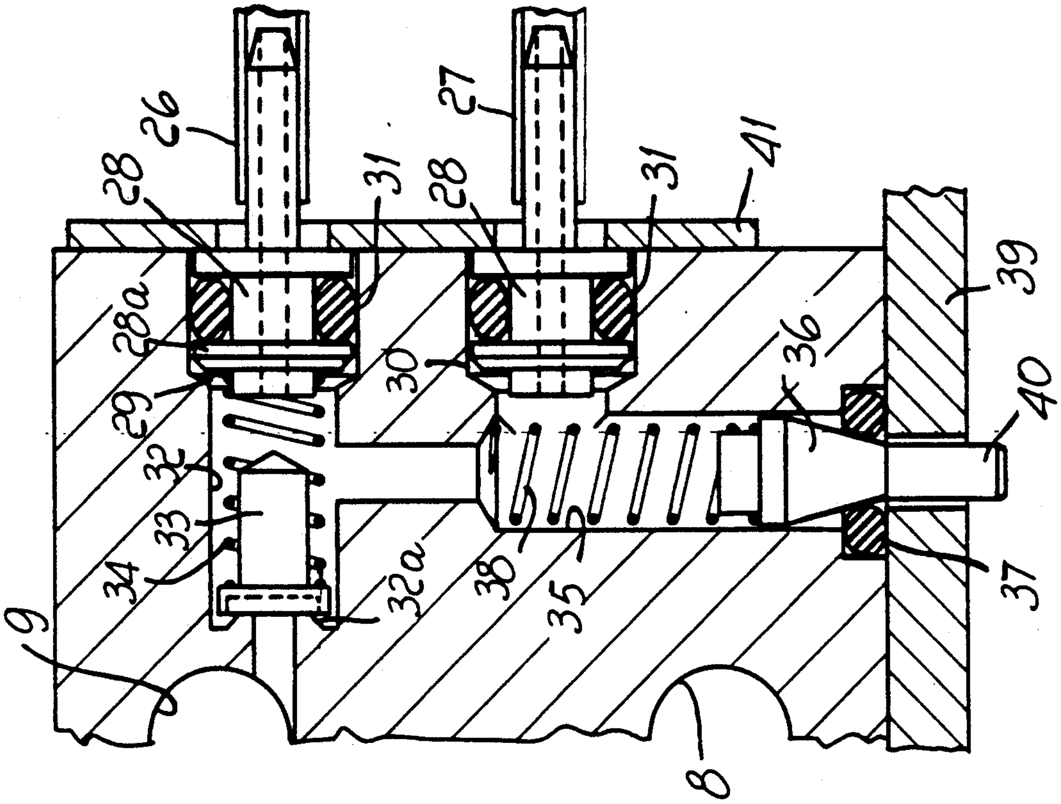
FIG. 4 is a vertical sectional view of a distribution body of said hydraulic and pneumatic power supply channels.
Figure 3:
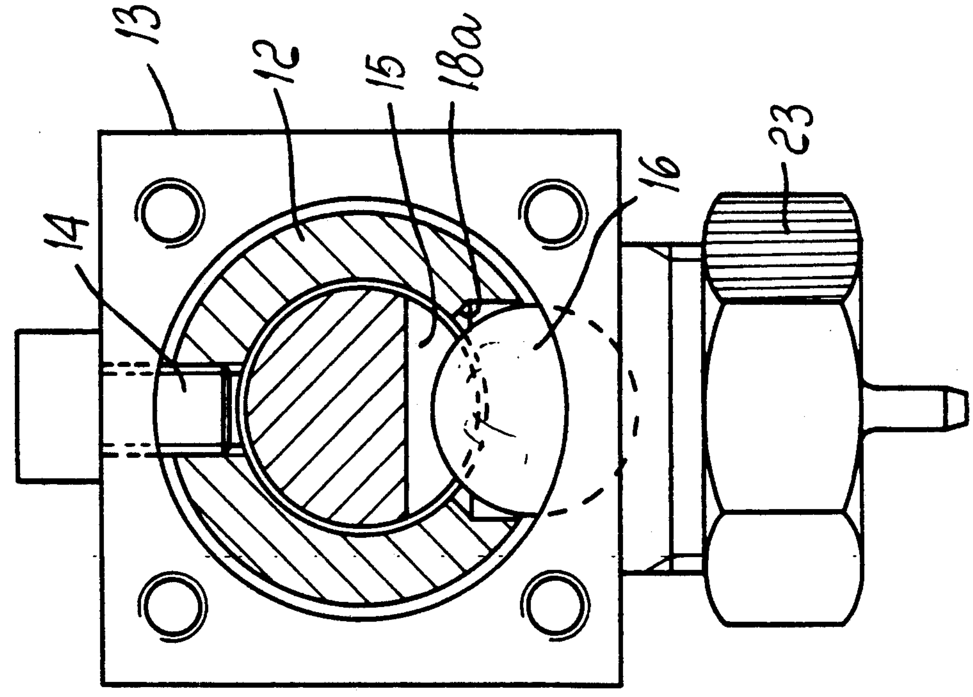
FIG. 3 is a sectional view taken through the locking means.

The sleeve 19 is threaded externally and a ring 23 is screwed thereon and is sealed by a gasket 24. The ring 23 axially defines a perforated stem 25. Respective flexible tubes 26, 27 are fitted on the stems 25 of the rings 23 of said pair of coupling means and are connected to related bushes 28 mounted in corresponding seats 29, 30 defined in the body 7, as shown in FIG. 4. The bushes 28 externally define a pair of annular ridges 28a delimiting an accommodation groove for a sealing gasket 31 in the related seats 29, 30.

The seat 29 is defined at the end of a duct 32 which is transverse to the pneumatic power supply channel 9; the duct 32 defines an abutment seat 32a for a shutter 33 which is actuated into its closure position by a helical spring 34. The seat 30 is in turn connected to a branch duct 35 which leads from the branch duct 32; the branch duct 35 leads below the distribution body 7.

A further shutter 36 is slidably mounted in the duct 35 and is intended to define a vent valve. The shutter 36 has a conical profile for engaging an annular gasket 37 accommodated at the end of the duct 35; the shutter 36 is biased towards a closure position by a helical spring 38. The gasket 37 is retained by a plate 39 from which a tang 40 of the shutter 36 protrudes and functions as a pushbotton. A further plate 41 retains the bushes 28 in the respective seats 29, 30.

During installation, the operative blocks which have the chosen instruments are combined in a battery by placing the front of one adjacent to the rear face of the other. The pins 11 of each operative block are therefore inserted in the correspondiing tubular stems 12 of the adjacent operative block. This insertion is allowed by the retraction of the ball 16 into the accommodation seat 17; the piston 20, which is actuated by the spring 22 in the opposite direction with respect to the ball 16, in fact does not act on said ball.

The operative blocks combined in a battery are fixed in a similar manner to a common support which, in a known manner, is supported by an articulated arm and can be connected to the electric, hydraulic and pneumatic power supply.

The adjacent arrangement of the operative blocks furthermore determines the coupling of the electric connector 6 to the element which is complementary thereto and the coupling of the power supply channels 8 and 9 to the corresponding couplings which protrude from the rear face of said operative blocks. In this manner, one obtains a pair of continuous ducts which transverse the battery of operative blocks and which are intended to be connected to the hydraulic and pneumatic power supply, and the power supply to said blocks is furthermore thus obtained.

In order to perform the mutual locking of the operative blocks it is sufficient to connect the apparatus to the compressed-air delivery. The pressure of the flow of air which passes through the pneumatic power supply channel 9 is such as to open the shutter 33, against the biasing action of the spring 34, so as to connect the channel 9 to the ducts 32 and 35 of the distribution body 7; said ducts 32 and 35 are in turn connected, by means of the flexible tubes 26 and 27, to the chambers defined by the accommodation seats 17 of the pistons 20. The pistons 20 are therefore actuated so as to push the related balls 16 to engage the groove 15 defined on the pins 11.

When the pressure in the pneumatic supply channel ceases, the shutter 33 is pushed so as to instantly close the abutment seat 32a. This forms a pressurized compartment which commprises the ducts 32 and 35, the flexible tubes 26 and 27 and the chambers defined by the seats 17; said compartment has appropriate gaskets so as to ensure the sealing of the compressed air enclosed therein. Even at rest, therefore, the pistons 20 are actuated by a pressure which is sufficient to determine the locking of the pins 11 on the part of the respective balls 16.

In order to release the operative blocks it is necessary to press on the tang 40 which protrudes downward from the distribution body 7 so as to open the shutter 36 of the vent valve of the compressed air which locks the balls 16.

The described apparatus allows, in summary, to rapidly mount in a safely stable manner the different modular operative blocks without resorting to screw means and the like. The disassembly of the operative blocks for the addition or removal of an instrument or for performing maintenance is also rendered equally simple.

In the practical embodiment of the invention, the materials employed, as well as the shapes and dimensions, may be any according to the requirements.

I claim:

1. Apparatus with modular operative blocks for dentistry, each block bearing a respective instrument and having electric coupling means and means for the hydraulic and pneumatic power supply of said instrument which are connectable to similar connectors and power supply channels, wherein said operative blocks are mutually associable in series by means of coupling means which comprises at least one pin which protrudes from a front face of each operative block and is connectable to a corresponding seat arranged on a rear face of an adjacent one of said operative blocks, said pin being retained by locking means which are pneumatically actuated by means of a duct which is connectable to said pneumatic power supply channel of the instrument.

2. Apparatus according to claim 1, wherein said locking means comprise a ball which is freely mounted within a cylindrical accommodation seat perpendicular to said coupling seat of said pin, said accommodation seat defining a chamber, connected to said duct and sealingly slidably bearing a piston adapted for acting on said ball, against biasing action of spring means, so as to engage a groove of said pin.

3. Apparatus according to claim 1, wherein said duct defines an abutment seat for a shutter element which is actuated in closure position by spring means, so as to define a chamber which communicates with said locking means and is adapted for being pressurized by the flow of compressed air which passes through said pneumatic power supply duct.

4. Apparatus according to claim 1, wherein said duct communicates with a branch duct in which a shutter is slidably mounted and is intended to define a vent valve for the release of said pin.

5. Apparatus according to claim 4, wherein said shutter has a conical profile which engages an annular gasket accommodated at the end of said branch duct, said shutter being biased towards a closure position by spring means and having a tang which protrudes therefrom and is activatable as an opening pushbotton.

6. Apparatus according to claim 4, wherein said pneumatic power supply channel passes through a distribution body in which said duct is defined transversely to said power supply channel, said duct bearing said shutter element and being connected by means of a flexible tube to said chamber defined by the accommodation seat of said locking means, said branch duct which bears said vent valve being furthermore defined in said distribution body downstream with respect to said shutter element.

7. Apparatus according to claim 1, wherein said pin is made monolithically with a coaxial tubular stem, constituting said coupling seat for a corresponding pin of an adjacent operative block.

8. Apparatus according to claim 7, wherein said tubular stem is through-mounted in a support which defines, perpendicular to said tubular stem, a cylindrical accommodation seat of a piston.

9. Apparatus according to claim 1, wherein said coupling means comprise a pair of said pins which protrude from the front face of a box-like body of said operative block in spaced-apart positions.

* * * * *